(12) United States Patent
Eckelmann et al.

(10) Patent No.: US 12,107,418 B2
(45) Date of Patent: Oct. 1, 2024

(54) SYSTEM FOR THE ELECTRIC POWER SUPPLY OF A VEHICLE

(71) Applicant: Audi AG, Ingolstadt (DE)

(72) Inventors: Franziska Eckelmann, Caimersheim (DE); Thomas Glass, Mainburg (DE); Stefan Schoberer, Mindelstetten (DE); Mario Wildgruber, Rohrbach (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/864,283

(22) Filed: Jul. 13, 2022

(65) Prior Publication Data

US 2023/0015170 A1  Jan. 19, 2023

(30) Foreign Application Priority Data

Jul. 14, 2021 (DE) .......................... 102021118120.8

(51) Int. Cl.
*H02J 1/10* (2006.01)
*B60L 58/20* (2019.01)
*H02J 1/08* (2006.01)

(52) U.S. Cl.
CPC .............. *H02J 1/106* (2020.01); *B60L 58/20* (2019.02); *H02J 1/082* (2020.01); *B60L 2210/10* (2013.01); *H02J 2310/48* (2020.01)

(58) Field of Classification Search
CPC ........ H02J 1/106; H02J 1/082; H02J 2310/48; B60L 58/20; B60L 2210/10; Y02T 10/70

USPC .......................................................... 307/9.1
See application file for complete search history.

(56) References Cited

U.S. PATENT DOCUMENTS

| | | | | |
|---|---|---|---|---|
| 10,293,693 B2* | 5/2019 | Kim | ...................... | H02J 7/0068 |
| 10,793,019 B2* | 10/2020 | Duan | ..................... | H02J 7/0016 |
| 2010/0117593 A1 | 5/2010 | Piccard et al. | | |
| 2016/0207418 A1* | 7/2016 | Bergstrom | ............... | B60G 3/06 |
| 2018/0097370 A1* | 4/2018 | Kim | ....................... | G01G 19/00 |

FOREIGN PATENT DOCUMENTS

| | | | |
|---|---|---|---|
| CN | 211731116 U | | 10/2020 |
| DE | 102012003309 | * | 8/2013 |
| DE | 102012003309 A1 | | 8/2013 |
| DE | 102014201354 A1 | | 7/2015 |
| EP | 1928078 A1 | | 6/2008 |
| JP | 200955690 A | | 3/2009 |
| WO | 2011121974 A1 | | 10/2011 |

* cited by examiner

*Primary Examiner* — Richard Tan
(74) *Attorney, Agent, or Firm* — Seed IP Law Group LLP

(57) ABSTRACT

A system for the electric power supply of a vehicle, wherein the vehicle comprises multiple electricity users, comprises an energy accumulator and a DC/DC converter, wherein the energy accumulator comprises n strands each having at least one energy accumulator cell and the DC/DC converter comprises n input modules, wherein each time one strand of the energy accumulator and one input module of the DC/DC converter form a closed circuit, wherein n circuits are interconnected, and wherein each circuit is connected to the users.

7 Claims, 3 Drawing Sheets

SYSTEM FOR THE ELECTRIC POWER SUPPLY OF A VEHICLE

BACKGROUND

Technical Field

Embodiments of the invention relate to a system for the electric power supply of a vehicle and a method for the electric power supply of a vehicle.

Description of the Related Art

A motor vehicle may have an electrical onboard network, connecting an electric energy accumulator to electricity consumers.

A redundant energy management system for an unmanned vehicle is described in the document CN 211731116 U.

The document EP 1 928 078 A1 describes a motor vehicle having a fuel cell with a multiple input/output converter.

A power supply system for a motor vehicle is described in the document WO 2011/121974 A1.

Given this background, one problem to be solved was the reliable supply of electric power to the electricity users of a vehicle.

BRIEF SUMMARY

Some embodiments are designed for the electric power supply of a vehicle, such as a motor vehicle, wherein the vehicle comprises multiple electricity users, usually consumers, among others. The system is arranged in the vehicle and comprises an electric energy accumulator and a direct current/direct current or DC/DC converter. The electric energy accumulator, such as a battery, comprises at least two or more, namely n strands, each having at least one energy accumulator cell. The DC/DC converter comprises at least two or more, namely n input modules. Each time one strand of the energy accumulator and one input module of the DC/DC converter are interconnected in a closed circuit and thus form a respective closed circuit. The total of n closed circuits are connected on one side, for example across a common node, to and/or among each other. Furthermore, each time one of the n closed circuits is connected to the users, each time the strand and the input module being connected to the users.

In one embodiment, the DC/DC converter with its n input modules is configured and/or provided as a center tap for the n strands and their energy accumulator cells of the energy accumulator and it is used as a center tap for the strands. Each input module is designed and/or designated as an input stage in its configuration.

The system comprises, e.g., an energy accumulator, such as a battery or a storage cell, having two strands, and a DC/DC converter having two input modules, each time one strand and one input module being connected on both sides across at least two lines in order to form a respective closed circuit. It is also possible for the energy accumulator to comprise n>2 strands and the DC/DC converter to comprise n>2 input modules. Within a closed circuit of the total of n circuits, the one strand and the one input module are connected to each other on both sides by lines. The total of n closed circuits are connected to or among each other, on the one hand, for example by the common node. On the other hand, each circuit is connected to the users of the onboard network. The strand and the input module of a respective closed circuit and thus also the n circuits are hooked up in parallel between the nodes and the users. The DC/DC converter here forms the common center tap for all n input modules and all n strands.

Each strand comprises at least one energy accumulator cell, such as a battery cell, and multiple energy accumulator cells can be connected to each other in series and/or in parallel in a respective strand. It is possible for the DC/DC converter to be situated as an external component outside the energy accumulator or as an internal component in the energy accumulator and integrated with it.

In one embodiment, each time a closed circuit is connected across an isolating element such as a switch and/or a contactor to the electricity users. In this case, the strand and the input module of the respective circuit are connected across this isolating element to the users.

The strands and the input modules of the DC/DC converter designed as and/or to be used as a center tap are adapted to providing the users with an electrical voltage on two different voltage levels and/or having two different voltage levels, usually with a first or a second voltage level. The first low voltage amounts to 12 V, for example, in the context of the usual voltage fluctuations accompanying an operation, and the second high voltage level amounts to 48 V, for example, in the context of the usual voltage fluctuations accompanying an operation. The high voltage level corresponds to a single-digit multiple, here, four times the low voltage level. The voltage is provided with the first voltage level or with the second voltage level, each time a respective user being provided with the electrical voltage having that voltage level which is intended for the operation. With the energy accumulator and the DC/DC converter, the users are supplied with electric power at the one and/or both different voltage levels.

In one embodiment, the users are likewise configured and/or provided as components of the system, the users being connected to each other in parallel and/or in series.

In some embodiments a method is intended for the electric power supply of a vehicle, wherein the vehicle comprises multiple electricity users. In the method, an energy accumulator and a DC/DC converter are used, the energy accumulator comprising n strands, each having at least one energy accumulator cell, and the DC/DC converter comprising n input modules, usually forming a center tap for the strands. Each time one strand of the energy accumulator and one input module of the DC/DC converter are interconnected at both ends, usually across lines, and each time one strand and one input module form a closed circuit. The total of n closed circuits are connected on one side to and/or among each other, for example across a common node. Furthermore, each time one of the n closed circuits is connected to the users, the strand and the input module being connected to the users.

It is possible to implement one embodiment of this method with one embodiment of the proposed system.

In the method, by definition, a primary electrical subnet of an onboard network of the vehicle is formed by the strands of the electric energy accumulator and the input modules of the DC/DC converter as a center tap and a secondary electrical subnet of the onboard network is formed by the electricity users. In one embodiment, at least one further subnet can be connected to the described onboard network, i.e., to the two subnets, having at least one further energy accumulator, at least one further direct current converter, and/or at least one further user. All the subnets can be connected to each other.

In this case, a higher availability is provided for the primary electrical subnet than for the secondary electrical subnet.

In the method, electric energy can be exchanged unidirectionally or bidirectionally between the strands or their energy accumulator cells of the energy accumulator and the users. It is possible for at least one user to be supplied with electric energy from the energy accumulator, i.e., from at least one strand of the energy accumulator. Accordingly, it is possible to charge at least one strand of the electric energy accumulator with electric energy from at least one user or to charge the user and store electric energy therein. A user is configured e.g., as an electric machine for driving the vehicle, and in one operating mode as an electric motor it transforms electric energy from the energy accumulator into mechanical energy and moves the vehicle. In one operating mode as an electric generator, the electric machine for example in a recuperation transforms mechanical energy into electric energy by virtue of its movement, and this is stored in the energy accumulator. It is possible for a user to be configured, e.g., as a fuel cell and thus as an energy source, the electric energy of which can likewise be stored in the energy accumulator. At least one further user can be configured as an actuator, a sensor, and/or a device, for example as at least one controller of the vehicle.

Thanks to the above described layout of the DC/DC converter and its connection to the strands of the energy accumulator, such as a high-voltage or HV battery, in one realization of the method and the system a highly available power supply of the onboard network of the vehicle is provided on two voltage levels of, e.g., 12 V and 48 V. In this case, the onboard network with the two voltage levels will supply electric power to two or more strands of the energy accumulator through the DC/DC converter, configured as a center tap, having two or more input modules as input stages. The strands of the energy accumulator, which can also be called substrands, for example, form together with the input modules of the DC/DC converter parallel power supply pathways for the users or consumers of the onboard network. Any outage of one strand will not result in an outage, especially a complete outage, of the power supply of the onboard network, since its availability is enhanced by virtue of the parallel arrangement of the strands between each other. The electric energy accumulator can be realized by a variable battery concept, in which case it is conceivable for the strands to have different numbers of energy cells and/or different configurations of energy cells, such as battery cells and/or capacitors. The DC/DC converter comprises a redundant input circuit thanks to the at least two input modules, such as input stages. Thus, an outage of one input module of the input circuit does not result in the outage of the power supply of the onboard network.

Of course, the features mentioned above and yet to be explained in the following can be used not only in the particular indicated combination, but also in other combinations or standing alone, without leaving the scope of the present disclosure.

DETAILED DESCRIPTION

The figures are described in relation with each other. The same reference numbers are assigned to the same components.

Figure 1:
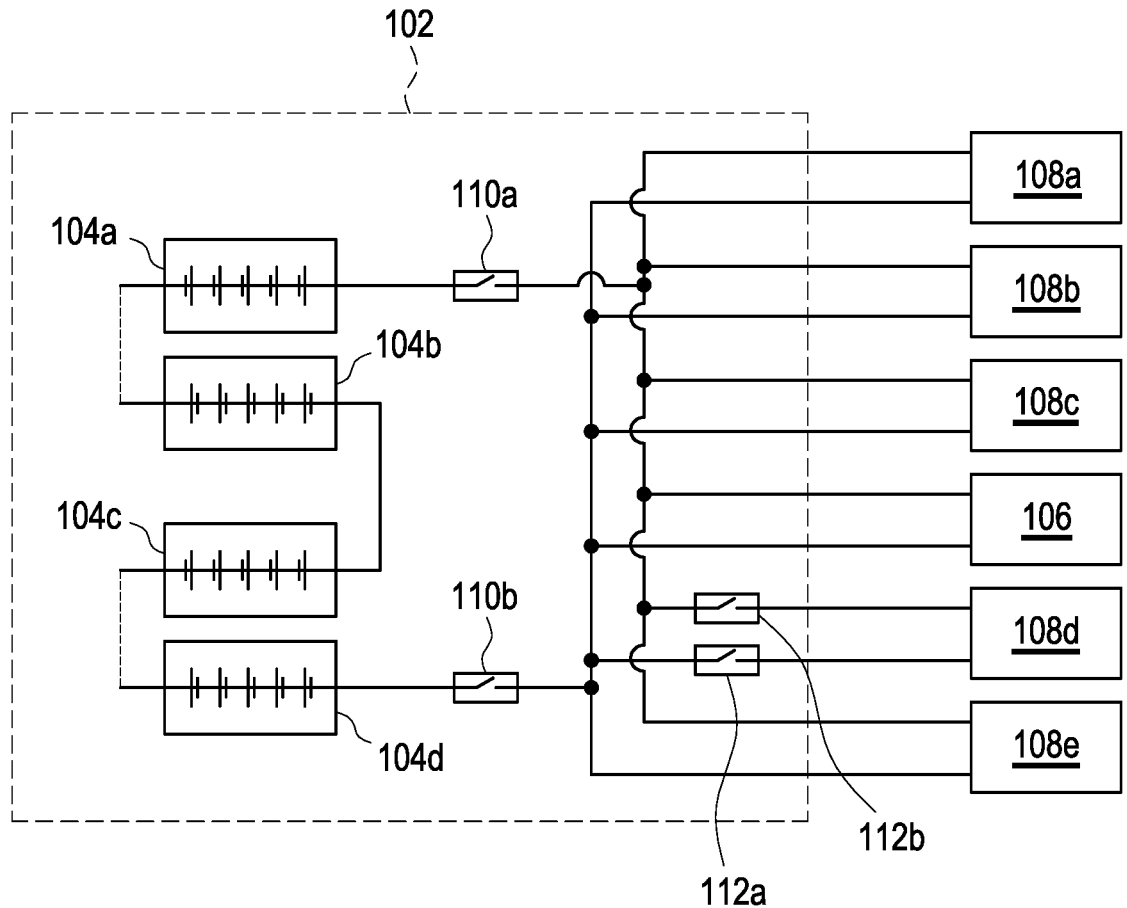
FIG. 1a shows in schematic representation an example of an onboard network.
FIG. 1b shows in schematic representation another example of an onboard network.
Figure 1:
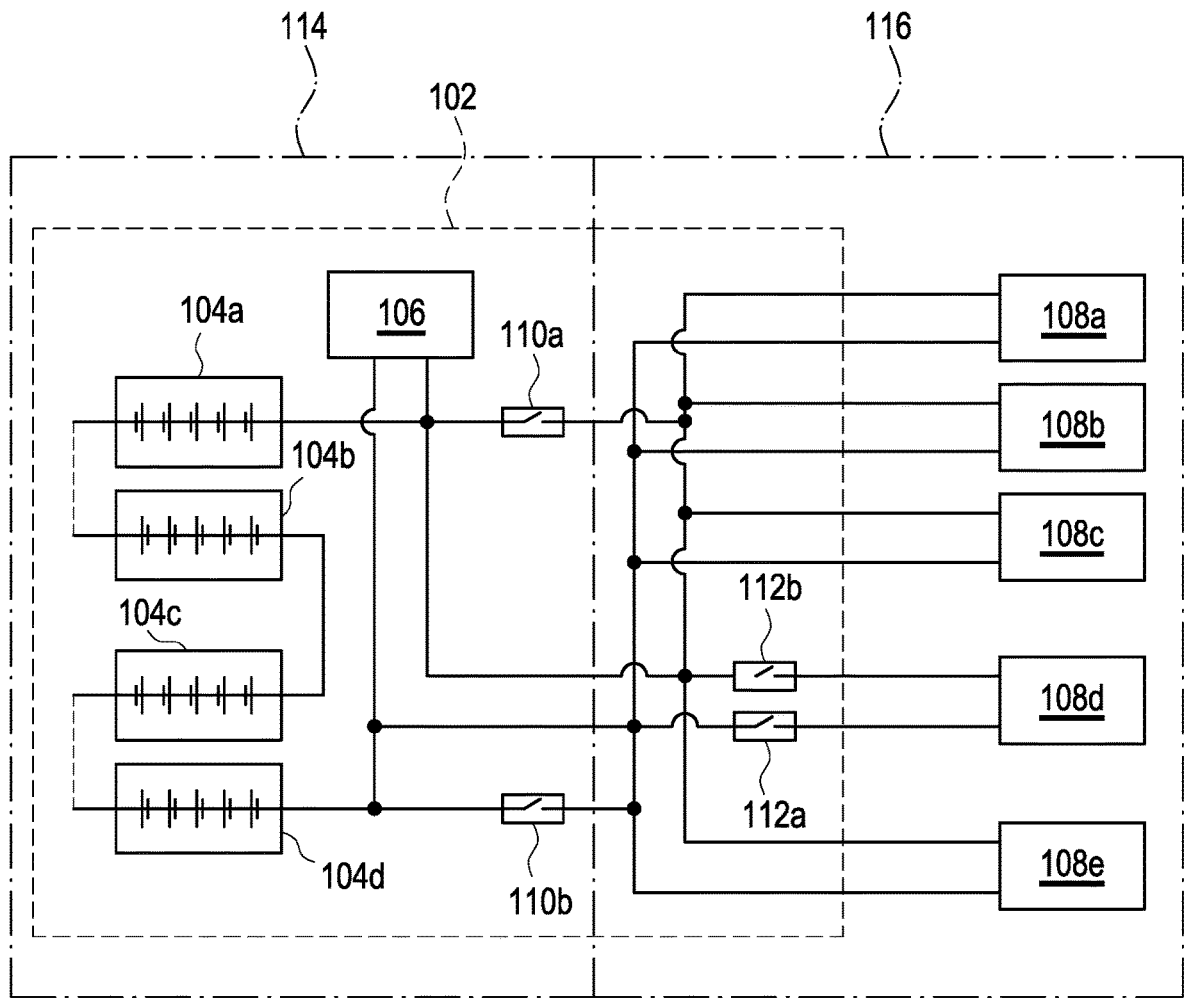

Each onboard network of a vehicle as shown in FIGS. 1a and 1b comprises an energy accumulator 102 having four strands 104a, 104b, 104c, 104d each time. These strands 104a, 104b, 104c, 104d are connected to multiple users 108a, 108b, 108c, 108d, 108e. Furthermore, each onboard network has a DC/DC converter 106 for supplying the users 108a, 108b, 108c, 108d, 108e with different voltages of 12 V and 48 V, while in the case of the onboard network of FIG. 1a the DC/DC converter 106 like the other users 108a, 108b, 108c, 108d, 108e is connected to the energy accumulator 102. By contrast, the DC/DC converter 106 in the onboard network of FIG. 1b is arranged in the energy accumulator 102. It is possible through the DC/DC converter 106 to provide electric power at two voltage levels, here with a first voltage level of 12 V or a second voltage level of 48 V. There are configured here a first user 108a for heating, a second user 108b for cooling, a third user 108c for propulsion of the vehicle, a fourth user 108d for the DC charging, and a fifth user 108e for the AC charging.

In the onboard networks, the four strands 104a, 104b, 104c, 104d switched in series are connected across two main isolating elements 110a, 110b to the users 108a, 108b, 108c, 108d, 108e. Furthermore, the fourth user 108d for the DC charging is connected across two DC isolating elements 112a, 112b to the energy accumulator 102 and the other users 108a, 108b, 108c, 108e.

Both of the presented onboard networks are configured as high-voltage onboard networks. In one respective topology, it is possible for the energy accumulator 102 configured here as a high-voltage energy accumulator to be separated by the isolating elements from the onboard network. All of the users 108a, 108b, 108c, 108d, 108e as components downstream from the main isolating elements 110a, 110b in the energy accumulator 102 can be connected to it and powered by it. This also includes the DC/DC converter 106 for supplying the two voltage levels for the onboard network. In event of a fault, all of the users 108a, 108b, 108c, 108d, 108e are separated by the main isolating elements 110a, 110b from the energy accumulator 102, e.g., a high-voltage battery, and the supplying of the onboard network with the DC/DC converter 106 is interrupted.

Starting with the onboard network of FIG. 1a, in the onboard network of FIG. 1b a topology of the high-voltage onboard network is divided into a highly available subnet 114 and a non-highly available subnet 116, so that in event of a fault in the non-highly available subnet 116 the entire onboard network is not affected, but instead only the subnet 116 affected by the fault is switched off, thereby preventing a disconnection of the highly available subnet 114. The DC/DC converter 106 for the supplying of the onboard network is connected by the main contactors of the energy accumulator 102. In order to enhance the availability of safety-relevant systems or components of the vehicle, one customary option is to develop redundant systems or components. In this way, upon outage of one part of the onboard networks presented here, e.g., one strand 104a, 104b, 104c, 104d, the basic functionality of the system or component of the vehicle will be maintained. If the energy accumulator 102 is considered from the standpoint of a functional safety, faults may occur either in an electronics or in a cell of a respective strand 104a, 104b, 104c, 104d. However, no improvement is achieved through a redundant electronics, since in the event of a failure of a cell and/or a strand 104a, 104b, 104c, 104d no further electric power can be supplied. The assumed failure rate of a cell or a strand 104a, 104b, 104c, 104d is dependent on the particular cell technology, being so large that it cannot be ignored. For this reason, it is provided that the availability of safety-relevant systems or components will be assured, e.g., by separate batteries.

Figure 2:
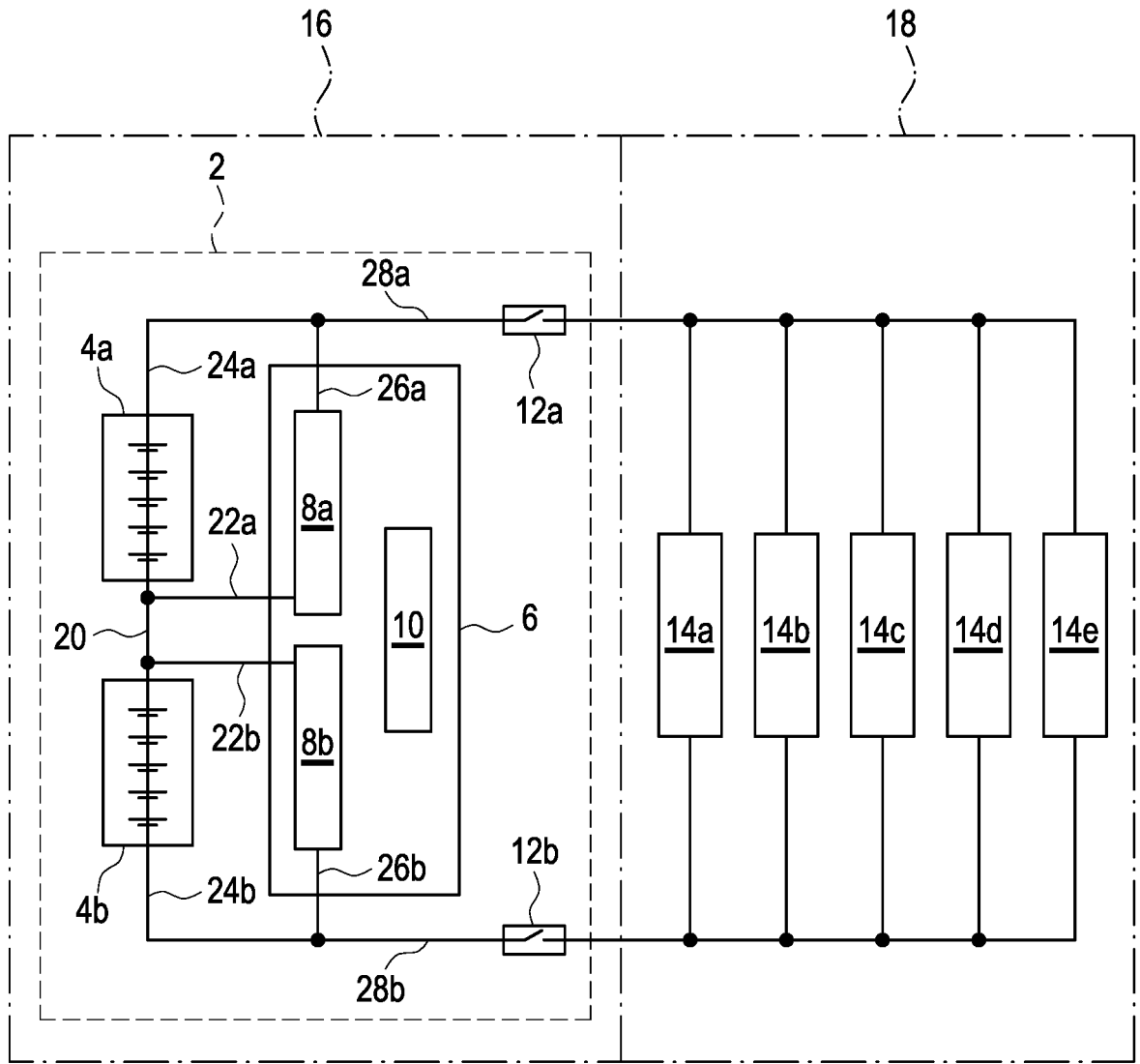
FIG. 2 shows in schematic representation an embodiment of a system to carry out one embodiment of a method as described herein.

The embodiment of the system that is shown schematically in FIG. 2 is designed for an electrical onboard network of a vehicle, here, a motor vehicle or automobile. By definition, it is provided that the following described components of the proposed system are also configured as components of the onboard network of the vehicle. In detail, the system and thus the onboard network comprises an electric energy accumulator 2 having two strands 4a, 4b, each comprising multiple electric energy accumulator cells hooked up in series. Furthermore, a direct current of DC/DC converter 6 is provided here. This in turn comprises a first input module 8a and a second input module 8b, which in one embodiment are configured as input stages and form an input circuit of the DC/DC converter 6. Furthermore, the DC/DC converter 6 has an output 10.

The onboard network or the system comprises multiple electricity users 14a, 14b, 14c, 14d, 14e. These involve a first drive device as the first user 14a, a second drive device as the second user 14b, both of them configured as electric machines for propelling the vehicle, a water heater as the third user 14c, an electric air conditioning compressor (eACC) as the fourth user 14d and an AC charger as the fifth user 14e, all of them being hooked up in parallel with each other. Furthermore, the onboard network may comprise further users not represented here, such as electricity consumers and/or electrical energy sources. Further users may be configured, e.g., as a brake system, a steering system, and/or mechanical fallback levels of the vehicle, by which for example a Steer-by-Wire system or an electrical steering system and/or a Brake-by-Wire system or an electrical brake system for the vehicle can be realized.

The embodiment of the system comprises two closed circuits, namely, a first closed circuit, comprising a first strand 4a of the energy accumulator 2 and the first input module 8a of the DC/DC converter 6, being connected to each other on both sides by lines, and a second closed circuit, comprising a second strand 4b of the energy accumulator 2 and the second input module 8b of the DC/DC converter 6, likewise connected to each other on both sides by further lines. The DC/DC converter 6 here forms a center tap for the strands 4a, 4b of the energy accumulator 2 and is used in the embodiment of the method described herein as a center tap for the strands 4a, 4b.

By definition, it is provided here that the energy accumulator 2 with the DC/DC converter 6 integrated in it forms a primary subnet 16 and the users 14a, 14b, 14c, 14d, 14e form a second subnet 18 of the onboard network, there being provided for the primary subnet 16 a higher availability than for the secondary subnet 18. It is possible to provide the users 14a, 14b, 14c, 14d, 14e with electric energy at two voltage levels via the DC/DC converter 6, here, on a first voltage level of 12 V or a second voltage level of 48 V. With the DC/DC converter 6, all the users or consumers 14a, 14b, 14c, 14d, 14e are supplied with electric energy as needed. Each time, electric energy is provided to the user 14a, 14b, 14c, 14d, 14e either on the first voltage level of 12 V or alternatively on the second voltage level of 48 V, depending on which voltage level is intended for the particular user 14a, 14b, 14c, 14d, 14e. The users 14a, 14b, 14c, 14d, 14e, etc., are configured as controllers and/or designed for the steering or braking of the vehicle. In FIG. 2 in particular the users 14a, 14b, 14c, 14d, 14e are shown schematically with the voltage level of 48 V and are thus high-voltage consumers.

In detail, the system comprises multiple lines. One line configured or designated as a connection line 20 connects the two strands 4a, 4b inside the energy accumulator 2 in a series circuit, the connection line 20 forming a node between the strands 4a, 4b. Furthermore, each strand 4a, 4b here is connected to the DC/DC converter 6 across an input line 22a, 22b, both of which are also connected to the connection line 20 between the strands 4a, 4b. The first strand 4a here is connected by a first input line 22a to the first input module 8a of the DC/DC converter 6 and the second strand 4b by a second input line 22b to the second input module 8b of the DC/DC converter 6, the two strands 4a, 4b being connected to the DC/DC converter 6 in a parallel circuit. Furthermore, each strand 4a, 4b is connected to an intermediate line 24a, 24b, which is connected to an output line 28a, 28b. In detail, the first strand 4a is connected by a first intermediate line 24a, a first output line 28a and a first isolating element 12a to the users 14a, 14b, 14c, 14d, 14e of the onboard network. The second strand 4b is connected by a second intermediate line 24b, a second output line 28b and a second isolating element 12b likewise to the users 14a, 14b, 14c, 14d, 14e of the onboard network. Moreover, the first input module 8a of the DC/DC converter 6 is connected by a first access line 26a to the first intermediate line 24a and the first output line 28a. The second input module 8b of the DC/DC converter 6 is connected by a second access line 26b to the second intermediate line 24b and the second output line 28b.

Within the first closed circuit, the first strand 4a and the first input module 8a are interconnected on the one hand by the first input line 22a as one line and on the other hand by the first access line 26a and the first intermediate line 24a as further lines. Accordingly, within the first closed circuit the second strand 4b and the second input module 8b are interconnected on the one hand by the second input line 22b as one line and on the other hand by the second access line 26b and the second intermediate line 24b as further lines. The output 10 of the DC/DC converter 6 goes in the direction of the onboard network with the two voltage levels of 12 V and 48 V to supply all the consumers in the vehicle with a voltage level intended for the particular consumer, e.g., for the charging of a 12 V battery.

In some embodiments, a system to carry out the embodiment of the method described herein, the DC/DC converter 6 is supplied with electric energy across two separate input modules 8a, 8b as the input circuit by the two or more strands 4a, 4b of the energy accumulator 2 shown here. A tapping of the energy accumulator 2 is realized via the DC/DC converter 6 as a center tap for the energy accumulator 2. The redundancy created here enhances the availability of an energy supply by the energy accumulator 2 many times over, since the outage of a single strand 4a, 4b as a module of the energy accumulator 2 is compensated each time by at least one other strand 4a, 4b. In one layout of the DC/DC converter 6, it is provided that the two input modules 8a, 8b are separate from each other and each supplied by one strand 4a, 4b.

With the proposed system, a concept is provided in which an outage of one strand 4a, 4b affects only part of the energy accumulator 2, and electric power for the users 14a, 14b, 14c, 14d, 14e can still be provided with the still functioning strand 4a, 4b or a corresponding part of the energy accumulator 2, and each user 14a, 14b, 14c, 14d, 14e can be provided with power as needed either on the voltage level of 12 V or 48 V. The proposed system is technically simple in its implementation, since redundancy can be produced here with a few additional components in the energy accumulator 2 and the DC/DC converter 6, and with the system and the method a failure rate of the onboard network is reduced and its supply with electric energy is improved by the proposed division into two subnets 16, 18.

German patent application no. 10 2021 118120.8, filed Jul. 14, 2021, to which this application claims priority, is hereby incorporated herein by reference, in its entirety. Aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A system for electric power supply of a vehicle, wherein the vehicle includes a plurality of electricity users, the system comprising:
   an energy accumulator;
   a direct current/direct current (DC/DC) converter;
   a first output line which, in operation, is connected to the electricity users; and
   a second output line which, in operation, is connected to the electricity users; and
   wherein the energy accumulator includes a plurality of strands, including a first strand and a second strand;
   wherein each of the strands has at least one energy accumulator cell;
   wherein the DC/DC converter includes a plurality of input modules, including a first input module and a second input module;
   wherein each of the strands of the energy accumulator forms one of a plurality of closed circuits with one of the input modules of the DC/DC converter;
   wherein the closed circuits are interconnected;
   wherein each of the closed circuits is connected to the electricity users;
   wherein each of the input modules of the DC/DC converter is connected to the electricity users;
   wherein at least one of the electricity users, in operation, charges at least one of the strands;
   wherein the first input module is connected to a first input line and a first access line;
   wherein the second input module is connected to a second input line and a second access line;
   wherein the first input line and the second input line are connected to the first strand and the second strand;
   wherein the first access line, in operation, is connected via the first output line to the electricity users;
   wherein the second access line, in operation, is connected via the second output line to the electricity users;
   wherein the first strand, the second strand, and the DC/DC converter, in operation, provide the electricity users with an electrical voltage having two different nonzero voltage levels, with a first nonzero voltage level or with a second nonzero voltage level; and
   wherein the first strand and the DC/DC converter, in operation, provide the electricity users with the electrical voltage having two different nonzero voltage levels, with the first nonzero voltage level or with the second nonzero voltage level during an outage of the second strand.

2. The system according to claim 1, wherein the DC/DC converter is configured as a center tap for the strands.

3. The system according to claim 1, wherein each closed circuit is connected across an isolating element to the electricity users.

4. The system according to claim 1, comprising the electricity users, wherein the electricity users are connected to each other in parallel.

5. A method in a system for electric power supply of a vehicle, wherein the vehicle includes a plurality of electricity users, wherein the system includes an electric energy accumulator, a direct current/direct current (DC/DC) converter, a first output line which, in operation, is connected to the electricity users, and a second output line which, in operation, is connected to the electricity users, wherein the electric energy accumulator includes a plurality of strands, including a first strand and a second strand, wherein each of the strands has at least one energy accumulator cell, wherein the DC/DC converter includes a plurality of input modules including a first input module and a second input module, wherein the first input module is connected to a first input line and a first access line, wherein the second input module is connected to a second input line and a second access line, wherein the first input line and the second input line are connected to the first strand and the second strand, wherein the first access line is connected to the first strand, and wherein the second access line is connected to the second strand, the method comprising:
   forming a plurality of closed circuits, wherein each of the strands of the energy accumulator forms one of the closed circuits with one of the input modules of the DC/DC converter;
   interconnecting the closed circuits;
   connecting each of the closed circuits to the electricity users;
   connecting each of the input modules of the DC/DC converter to the electricity users;
   connecting the first access line to the electricity users via the first output line;
   connecting the second access line to the electricity users via the second output line;
   charging, by at least one of the electricity users, at least one of the strands;
   providing, by the first strand, the second strand, and the DC/DC converter, the electricity users with an electrical voltage having two different nonzero voltage levels, with a first nonzero voltage level or with a second nonzero voltage level; and
   providing, by the first strand and the DC/DC converter, the electricity users with the electrical voltage having two nonzero different voltage levels, with the first nonzero voltage level or with the second nonzero voltage level during an outage of the second strand.

6. The method according to claim 5, in which a first electrical subnet is formed from the strands of the electric energy accumulator and the DC/DC converter and a second electrical subnet of an onboard network is formed by the electricity users.

7. The method according to claim 6, in which a higher availability is provided for the first electrical subnet than for the second electrical subnet.

* * * * *